UNITED STATES PATENT OFFICE.

ORLANDO VENNING THOMAS, OF PENANG, STRAITS SETTLEMENTS.

ELECTRICALLY-INSULATING COMPOUND.

1,153,975.      Specification of Letters Patent.      Patented Sept. 21, 1915.

No Drawing. Application filed April 7, 1911, Serial No. 619,466. Renewed August 17, 1915. Serial No. 46,013.

*To all whom it may concern:*

Be it known that I, ORLANDO VENNING THOMAS, a subject of the King of Great Britain and Ireland, and a resident of Penang, Straits Settlements, have invented a new or Improved Electrically-Insulating Compound, of which the following is a specification.

The object of my invention is to produce an electrically insulating compound which shall have high di-electric properties which shall be plastic so as not to crack while at the same time having sufficient solidity not to "run" when cold, which shall be waterproof, durable and chemically inert in the presence of reagents sometimes existing in sub-soil waters and which shall retain these characteristics under all climatic extremes of temperature.

In carrying out my invention I take three substances namely mica, resin and resin oil. The mica I prefer to have in as pure a state as possible, but purity is not absolutely necessary, and prior to preparing my compound the mica is ground to a fine powder and washed free of salt or alkaline substances with which it may be associated. The resin may be refined but I have found that resin in the ordinary commercial state gives good results. It is preferably ground to a fine powder in a dry state before mixing with the other ingredients, but this is not absolutely necessary. The resin oil should be as pure as possible and free of acids. I have found that resin oil in its ordinary commercial state gives good results.

In preparing my compound I take preferably equal proportions by weight of the three ingredients, mica in a finely powdered state, resin preferably in a finely powdered state and resin oil. The mica and resin are mixed in a dry state and the oil is then added and the mixture heated in a suitable vessel. During heating the mixture is stirred and when first heated it rapidly becomes fluid. On continuing the heating and stirring it becomes thick and pasty and it must then be still further heated until it again becomes fluid when it is ready to be poured off into barrels or other receptacles until required. When required for use the compound is heated to the fluid state in a boiler such for example as the ordinary tar or bitumen boiler of the kind used in road work.

Although I prefer to employ equal parts by weight of the three constituents of the mixture I may if desired depart from this proportion. Thus decreasing the proportion of mica or increasing the proportion of oil has the effect of softening the compound and vice versa by increasing the proportion of mica or decreasing the proportion of oil a harder and more brittle compound is obtained. If desired other minerals in small quantities may be added without detracting from the valuable properties of the compound and in certain cases I may employ a mineral oil in substitution for the resin oil.

I contemplate the employment of my compound chiefly for the insulation of conductors laid in underground troughs or the like. I also contemplate employing it for the insulation of cables or wires such as are used in wiring buildings for example and in this case I contemplate protecting the insulating compound by coverings of braid or tape. I further contemplate employing my compound for the impregnation of fiber, paper or other material employed as insulation in manufactured electric cables.

Having thus described my invention what I claim as new and desire to secure by Letters Patent is:—

An electrically insulating compound composed of ground mica washed free of salt or alkaline substances, resin and resin oil.

In witness whereof I have signed my name to this specification in the presence of two subscribing witnesses.

ORLANDO VENNING THOMAS.

Witnesses:
    LOUIS ALBAN COUTUR BIGGS.
    CHARLES CECIL ROGERS.